United States Patent Office 2,824,825
Patented Feb. 25, 1958

2,824,825
SOLUBILIZED PHENYL MERCURY ACETATE COMPOSITIONS

Joseph Fath, Morristown, George J. Leitner, Iselin, and Milton Nowak, Union, N. J., assignors, by mesne assignments, to Heyden Newport Chemical Corporation, a corporation of Delaware No Drawing. Application August 19, 1955
Serial No. 529,568

4 Claims. (Cl. 167—42)

This invention relates to liquid compositions comprising phenyl mercury acetate and to methods of producing the same.

The use of organo-mercurial compounds as fungicides, bactericides, germicides, i. e., antimicrobials generally, has long been established. It has achieved great commercial importance in recent years due to the increasing awareness of the economic losses incurred annually through the microbial decomposition of cellulosic articles of commerce. More particularly, consumer goods, such as textiles, rope, rubber, paper, leather, paints, varnishes, lacquers and protective coatings generally, if not adequately protected, will, under conditions of prolonged weathering and humidity, deteriorate rather rapidly due to attack by microorganisms, and the period of their usefulness will be foreshortened considerably. The practice of protecting such articles with organo-mercurials, and more particularly, phenyl mercurics, has resulted in preventing their early and undue deterioration, thus effecting great annual consumer savings.

A number of phenyl mercurics have been heretofore employed, but by far the best, from both a functional standpoint and the standpoint of economics, is phenyl mercury acetate. However, this particular compound has presented a number of problems. For example, it is normally a solid and has a relatively low solubility in diluting media such as must be employed in connection with its use. In fact, its solubility in water is only approximately 1 part of the acetate to 600 parts of water and the magnitude of its solubility in organic solvents is substantially the same. Such being the case, commercial distribution and shipment of such concentrations involve altogether too much bulk, the greater proportion of which is solvent. There has been an urgent need for a phenyl mercury acetate product of high concentration and consequent minimum solvent content and one object of the present invention is to provide such a product whereby it is possible to produce concentrations of from 5%–30% phenyl mercury acetate and even higher.

An important feature of this invention is that the phenyl mercury acetate products thereof in the concentrated form stated may be incorporated in the end products in which they are to be used by the simple act of stirring them.

Another disadvantage of phenyl mercury acetate compositions, as heretofore employed, is their lack of universal solubility. It has been heretofore necessary to prepare such compositions in accordance with the particular system in which they were to be used. If such an acetate were to be employed in an aqueous system, it was so constituted that it was useful only in such a system and the same was true with respect to phenyl mercury acetate useful in oil systems. Reissue Patent No. 23,863, dated August 31, 1954, is illustrative of phenyl mercury acetate capable of use only in aqueous systems. Hence another object of the invention is to produce what we may term a universal compound adapted for efficient and effective use in both types of systems.

An important feature of this invention is that its use is practically unrestricted in connection with the fungicide field and other fields where materials of this kind are useful and which involve oil or water vehicles. It may be noted in this connection that our tests have shown that when incorporated, for example, in oil vehicle paints which include metal drier catalysts, the presence of the products of this invention does not detrimentally affect or interfere with the drying performance of such catalysts. This fact is in marked contradistinction to the product set forth in Patent No. 2,423,121, issued July 1, 1947. That patent employs hydroxy alkyl amino compounds to effect solubilization of reaction products with phenyl mercury acetate and is directed primarily for use of these products in aqueous systems. Experience has shown that if an attempt is made to employ them in oil systems, such as oil base paints, the hydroxy alkyl amino compounds have an extremely detrimental effect upon said catalysts and, as a matter of fact, effectually prevent oxidative film formation. Furthermore, when used in aqueous systems such as latices, the cationic nature of these solutions very often interferes with the delicate colloidal system of the latex commonly produced by an anionic surfactant. The complete incompatibility and extremely detrimental effects of the use of anionic in the presence of cationic agents on an emulsified system is well recognized by those skilled in the art.

As a result of prolonged experimentation, research and tests, we have discovered that the aforesaid objects of this invention may be obtained by employing condensation products of alkylene oxides, more particularly, ethylene oxide, propylene oxide, butylene oxide, and certain reactants having at least one replaceable hydrogen atom, which may be utilized to solubilize phenyl mercury acetate in a manner essential to the performance of the functions stated.

Examples of compounds possessing the requisite hydrogen atom are: phenols, water-insoluble alcohols, fatty acids having at least 8 carbon atoms, water-insoluble amides having at least 8 carbon atoms, polyols, polyol esters, hydroxy esters, and water-insoluble mercaptans having at least 6 carbon atoms.

The compounds of this invention may be generally characterized by the formula

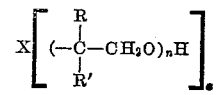

wherein $n$ is an integer greater than 1 and preferably between 2 and 50, R and R' are selected from the group consisting of hydrogen and alkyl, X is derived from compounds having at least one replaceable hydrogen atom and selected from the group consisting of phenols, water-insoluble alcohols, fatty acids having at least 8 carbon atoms, water-insoluble amides having at least 8 carbon atoms, polyols, polyol esters, hydroxy esters, water-insoluble mercaptans having at least 6 carbon atoms, and $a$ represents the number of reactive hydrogen atoms in the compound from which X is derived.

The preferred compounds of our invention belong to the class of compounds wherein R and R' are hydrogen atoms and are thus derived from ethylene oxide.

Specific examples of the compounds embraced within the above formula are the condensation products of an alkylene oxide and any one or more of the following, to wit: phenol, p-nonyl phenol, p-diisobutyl phenol, p-isobutyl phenol, p-tertiary amylphenol, decyl alcohol, lauryl alcohol, tridecyl alcohol, oleyl alcohol, stearyl alcohol, lauric acid, oleic acid, soya bean fatty acid, stearic acid, palmitic acid, rosin fatty acids, lauramide, n-octadecanamide, n-octadecenamide, ethylene glycol, propylene glycol, butylene glycol, glycerol, sorbitol, mannitol, sorbitan monooleate, sorbitan monopalmitate, sorbitan trilinoleate, sorbitol hexastearate, glycerol monostearate, glycerol dilaurate, tripropylene glycol monolaurate, pentapropylene glycol monostearate, castor oil, butyl lactate, ethyl glycolate, and tertiary dodecyl mercaptan.

For the purpose of practical formulation, we have found it to be of advantage at times to use a combination of two or more of the above compounds and the use of a multiple system of alkylene oxide condensates often materially enhances the dilutability, stability, flexibility of application and helps to reduce the production costs of our compositions.

Our protracted experiments and tests in connection with this invention have definitely demonstrated that in order to fulfill the functions ascribed thereto, i. e., in order that the phenyl mercury acetate-solubilizing agent composition be capable of forming a homogeneous solution and also be capable of universal application, it must be so constituted that there is at least twice as much solubilizing agent as phenyl mercury acetate present in the composition. A lower ratio of solubilizing agent to phenyl mercury acetate will not function in the manner stated.

The end products of this invention may be used in widely different environments, utilizing any of the foregoing vehicles whether they be used as paint vehicles or diluents, depending upon the use to which the materials are to be put. Examples of the vehicles or diluents with which compositions of this invention are compatible are: water, ethyl alcohol, isopropyl alcohol, mineral spirits, kerosene, linseed oil, V. M. & P. naphtha, xylol, toluol, soya bean oil, mineral oil, alkyd resin solutions, ethylene glycol monoethylether, dioxane, ethylene glycol, etc. In fact, the end products of this invention may be referred to as universal in their application to all systems and vehicles used in paints, other film-forming materials, and in other environments where phenyl mercury acetate has utility in the various arts.

The following examples are illustrative of the compositions of the present invention and the methods by which they are prepared:

Example 1

Into a 200 cc. beaker were placed 90 gms. of the condensation products of 10 mols of ethylene oxide and 1 mole of lauramide. The compound was heated to 80° C. with agitation. At this temperature there were added 10 gms. of phenyl mercury acetate and agitation was continued until complete solution had occurred. Upon cooling, the solution remained liquid and free flowing and contained 10% solubilized phenyl mercury acetate.

Example 2

Into a 800 cc. beaker were placed 100 gms. of water and 350 gms. of the condensation product of 15 mols of ethylene oxide and 1 mol of n-octadecenamide. While heating and agitating, 50 gms. of phenyl mercury acetate were suspended in the solution. After 20 minutes at 75° C. a solution was obtained which, upon cooling, remained clear and contained 10% solubilized phenyl mercury acetate.

Example 3

To 40 gms. of the condensation product of 1 mol of sorbitol and 30 mols of ethylene oxide in a 100 cc. beaker, there were added 6.0 gms. of phenyl mercury acetate. Heating to 80° C. and agitating for a period of 20 minutes yielded a clear solution which, upon cooling to room temperature, remained stable and yielded a composition containing 13% phenyl mercury acetate.

Example 4

To 45 gms. of the condensation product of ethylene oxide and sorbitan monolaurate (marketed as Tween 20, Atlas Powder Company), there were added 5 gms. phenyl mercury acetate at 85° C. Agitation for 10 minutes yielded a clear liquid which, upon cooling, remained uniform and consisted of a compound containing 10% phenyl mercury acetate.

Example 5

In 300 gms. of the ester produced by the condensation product of 1 mol of lauric acid and 9 mols of ethylene oxide, there were suspended 50 gms. of phenyl mercury acetate with thorough agitation. Heating was begun and when a temperature of 160° F. was obtained solution of the mercury compound became complete. The resulting composition contained 14.3% solubilized phenyl mercury acetate.

Example 6

Into a 100 cc. beaker there were placed 25 gms. of the condensation product of 1 mol of oleic acid and 25 mols of ethylene oxide, 20 gms. of ethylene glycol and 5 gms. of water. The mixture was agitated to uniformity and, at 180° F., there were dissolved 5 gms. of phenyl mercury acetate. The resulting clear solution contained 9% phenyl mercury acetate.

Example 7

To 45 gms. of the ester produced by the condensation of 18 mols of ethylene oxide and 1 mol of tall oil fatty acids (marketed as "Renex 20," Atlas Powder Company), there were added 5 gms. of phenyl mercury acetate at 80° C. Agitation for 10 minutes resulted in a clear liquid product containing 10% solubilized phenyl mercury acetate.

Example 8

To 45 gms. of the condensation product of 1 mol of nonyl phenol and 20 mols of ethylene oxide at 65° C., there were added 6 gms. of phenyl mercury acetate. Agitating at this temperature resulted in a clear solution in 20 minutes. Upon cooling, a stable composition containing 11.7% phenyl mercury acetate was obtained.

Example 9

5 gms. of phenyl mercury acetate were added to 20 gms. of the condensate of 15 mols of ethylene oxide and 1 mol of lauryl alcohol condensate at 75° C. with accompanied agitation. A stable composition containing 20% phenyl mercury acetate was obtained on cooling.

Example 10

To 45 gms. of the condensation products of 1 mol of castor oil with 15 mols of ethylene oxide there were added 7 gms. of phenyl mercury acetate. The mixture was agitated and heated to 80° C. After 15 minutes a solution was obtained which, upon cooling, remained clear and contained 13.4% solubilized phenyl mercury acetate.

Example 11

To 45 gms. of the nonionic surfactant produced by the condensation of 1 mol of phenol with 20 mols of ethylene oxide there were added 6 gms. of phenyl mercury acetate at 75° C. Heating at 75° to 80° C. for 10 minutes resulted in a clear, stable solution containing 11.7% phenyl mercury acetate.

Example 12

To 40 gms. of the polyoxyethylene sorbitol ester of lauric and oleic acids (marketed as "Atlox 1045A," Atlas Powder Company), there were added at 80° C., with accompanied agitation, 10 gms. of phenyl mercury acetate. After 20 minutes of agitation at this temperature, a stable solution containing 20% phenyl mercury acetate was obtained.

Example 13

To 45 gms. of the ether obtained in the condensation of 1 mol of diisobutyl phenol with 5 mols of ethylene oxide, there were added 7 gms. of phenyl mercury acetate. The mixture was heated at 80° C. for 15 minutes to give a clear solution containing 13.4% phenyl mercury acetate.

Example 14

To 40 gms. of di-propylene glycol monolaurate there were added 10 gms. of phenyl mercury acetate with accompanied agitation. The mixture was heated at 85°–90° C. for 5 minutes to produce a clear, homogeneous product, containing 20% phenyl mercury acetate. This composition was readily diluted with aromatic type solvents to give stable dilution.

Example 15

10 gms. of phenyl mercury acetate were dissolved in a mixture of 25 gms. of the condensation product of 1 mol of paratertiary octyl phenol and 15 mols of ethylene oxide and 20 gms. of the condensation product of 1 mol of tall oil fatty acids and 18 mols of ethylene oxide by heating and stirring for 10 minutes at 80° C. The resulting solution containing 18.2% phenyl mercury acetate can be diluted with water or aromatic solvents.

Example 16

7 gms. of phenyl mercury acetate were readily dissolved in 45 gms. of the condensation product of 1 mol of phenol and 5 mols of propylene oxide by heating at 75°–80° C. for 15 minutes. The resulting composition contained 13.4% phenyl mercury acetate.

Example 17

To 35 gms. of the condensation product of 1 mol of rosin fatty acids and 20 mols of ethylene oxide, there were added 15 gms. of phenyl mercury acetate with agitation. Upon heating this mixture for 15 minutes at 90° C., a product containing 30% phenyl mercury acetate was obtained.

The products of each of the foregoing examples were thoroughly tested and found to be compatible with the several vehicles hereinbefore referred to, proving that the end products of this invention are universal in their application.

In these tests the solubilized phenyl mercury acetate was simply poured into and stirred in the vehicle in order to incorporate it. In every case it was found to be stable in such vehicle and there was no appreciable precipitation noted even after prolonged periods of standing.

The products of the present invention, because of their compatibility with the vehicles referred to, enter into solution, in the majority of cases, so that they are more readily available to carry out their functions in practice and do not settle out. Furthermore the applied material in the vehicle is of uniform application throughout because the material and the vehicle constitute, in effect, a homogeneous solution, all parts of which are uniform. Such being the case, there is every indication from experiments already undertaken that a homogeneous solution of phenyl mercury acetate made in accordance with the present invention has a higher efficiency as a fungicide, germicide, weed killer, and in other economic poisons.

We wish to lay particular stress upon the ability of this invention to produce heretofore unobtainable concentrations in our end products. Such being the case, the shipping bulk is very materially reduced and the user has a greater leeway in the amount of dilution which may be employed depending upon the particular circumstances or end uses of the product. This is particularly true where pest control presents special problems and requires exceptionally large amounts of economic poisons to properly protect against mildew and other destructive organisms.

In some instances we may, if desired, add to the compositions of our invention minor amounts of compounds which tend to raise the pH of the system to above 7. Traces of ammonium hydroxide, for example, may sometimes be used advantageously in combination with the present compositions. We wish it understood, however, that this is not essential to the present invention.

The foregoing detailed description sets forth the invention in its preferred practical forms, but the invention is to be understood as fully commensurate with the appended claims.

Having thus fully described the invention, what we claim as new and desire to secure by Letters Patent is:

1. A composition of matter comprising phenyl mercury acetate solubilized by being in commingled state with a non-ionic surface active compound having the formula

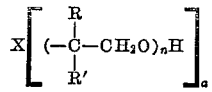

wherein $n$ is an integer greater than 1 and less than 50, R and R' are selected from the group consisting of hydrogen and alkyl having 1–2 carbon atoms, X is derived from compounds having at least one replaceable hydrogen atom and selected from the group consisting of phenols, water-insoluble alcohols, fatty acids having at least 8 carbon atoms, polyols, polyol esters, hydroxy esters, water-insoluble mercaptans having at least 6 carbon atoms, and $a$ represents the number of reactive hydrogen atoms in the compound from which X is derived, said composition being a non-aqueous homogeneous solution containing 5%–30% of phenyl mercury acetate and 95%–70% of said compound.

2. A composition according to claim 1, wherein the alkylene oxide is ethylene oxide.

3. A composition according to claim 1, wherein the alkylene oxide is propylene oxide.

4. A non-aqueous composition of matter comprising a homogeneous solution of phenyl mercury acetate and a condensation product of ethylene oxide and tall oil fatty acids there being at least twice as much condensation product as there is phenyl mercury acetate in the solution.

References Cited in the file of this patent

UNITED STATES PATENTS 2,637,677    Dinerstein _____ May 5, 1953

OTHER REFERENCES

Chemical Industries, March 1943, p. 328.

"Insecticidal Formulations," from Agri. Chemicals, November 1951, pp. 36, 37, 109 and 111.

Chem. Abst., vol. 44, 1950, p. 8052, "Cationic-anionic Incompatibility and Ointments Containing Cation-active Antiseptics."